D. H. FRIEND.
BEARING.
APPLICATION FILED AUG. 23, 1912.

1,223,952.

Patented Apr. 24, 1917.
2 SHEETS—SHEET 1.

Witnesses

Inventor
David H. Friend.
By Victor J. Evans,
Attorney

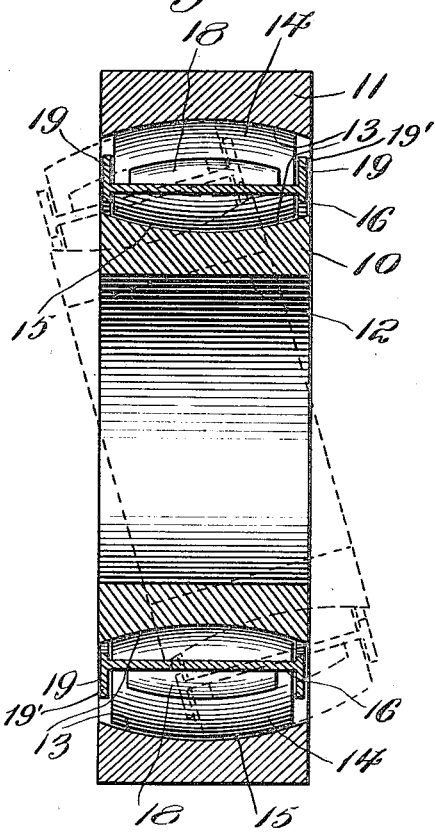
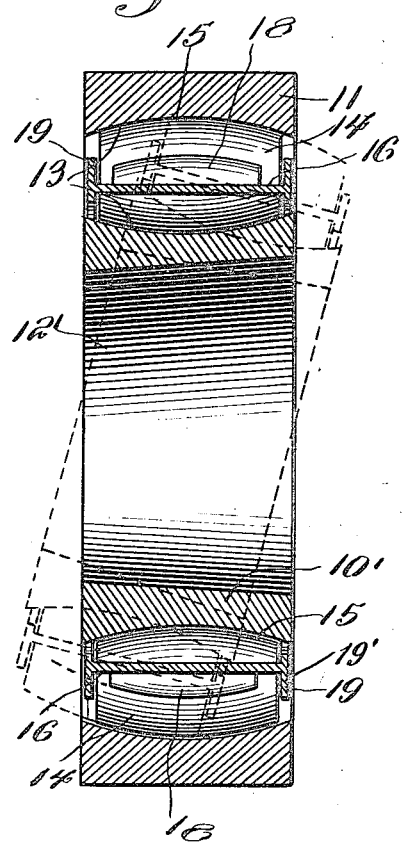
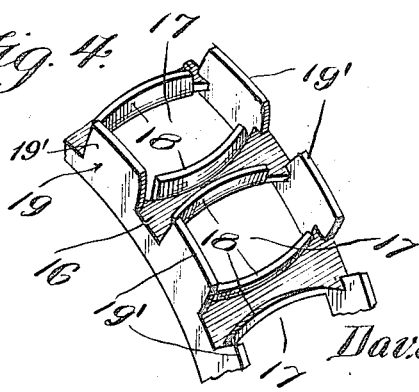

UNITED STATES PATENT OFFICE.

DAVID H. FRIEND, OF CANTON, OHIO.

BEARING.

1,223,952.

Specification of Letters Patent.   Patented Apr. 24, 1917.

Application filed August 23, 1912. Serial No. 716,650.

*To all whom it may concern:*

Be it known that I, DAVID H. FRIEND, a citizen of the United States, residing at Canton, in the county of Stark and State of Ohio, have invented new and useful Improvements in Bearings, of which the following is a specification.

The general object of this invention is the provision of a bearing so constructed as to reduce the amount of friction to a minimum, said bearing comprising inner and outer ring members which are arranged so as to permit of the free angular movement of a shaft and which will readily return to normal alinement when said shaft assumes its original position.

In carrying out the object of the invention generally stated above, it will be understood, of course, that the essential features thereof are susceptible to changes in details and structural arrangements, one preferred and practical embodiment being shown in the accompanying drawings, wherein:—

Fig. 3 is a transverse section on the line 3—3 of Fig. 1.

Fig. 4 is a fragmentary perspective of a roller bearing spacing element used in connection with the invention.

Fig. 5 is a view similar to Fig. 3 showing a slightly modified form.

Figure 1:
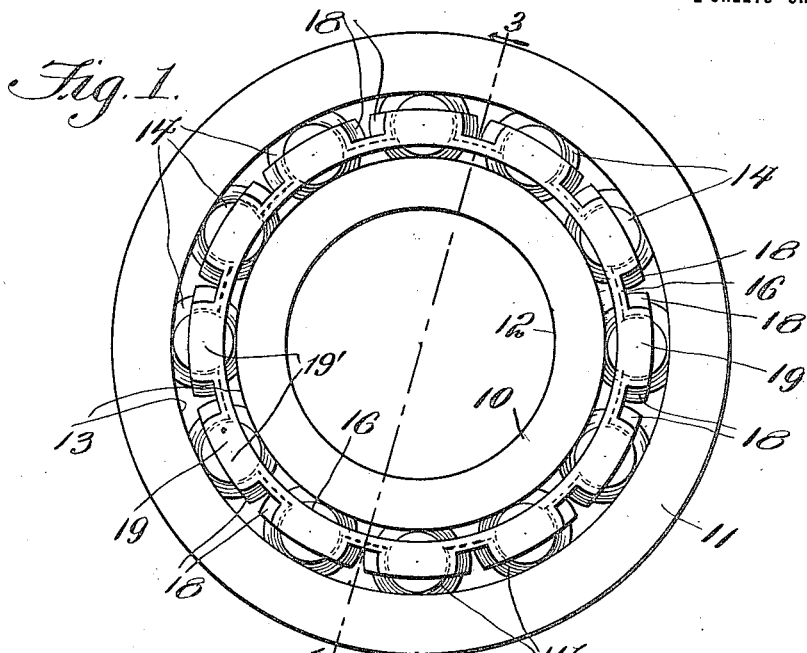
Figure 1 is a side elevation of the bearings constructed in accordance with the invention.
Figure 2:
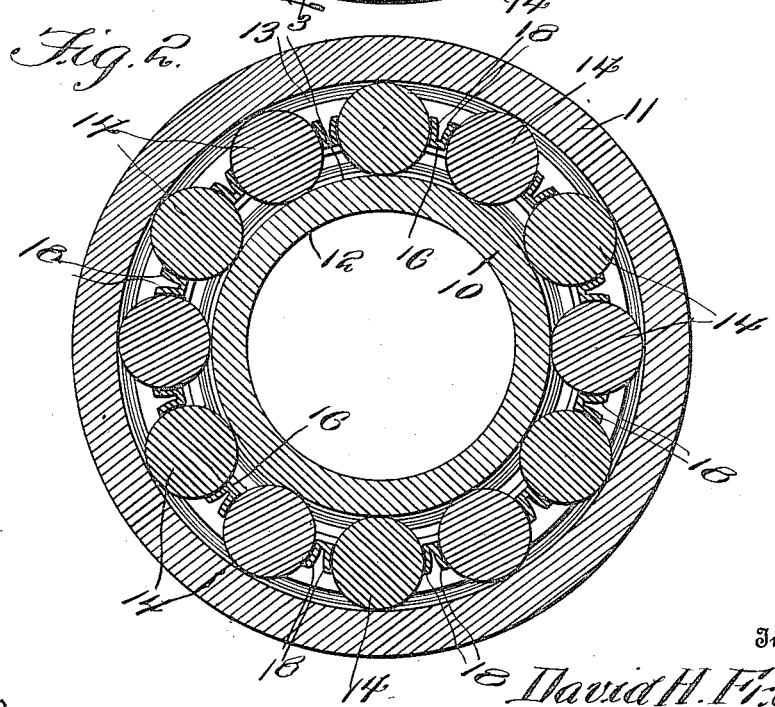
Fig. 2 is a vertical longitudinal sectional view thereof.

Referring more particularly to the accompanying drawings in which like reference characters designate similar parts, it will be seen that the invention comprises the spaced inner and outer ring members 10 and 11 respectively, the inner ring member 10 being provided with a central transverse opening 12 for the reception of a shaft on an engine or other machinery. The opposed inner faces of the ring members 10 and 11 are concaved as indicated at 13 and are adapted to receive therebetween a plurality of bearing rollers 14 which have their bearing faces convexed as indicated at 15 whereby the same may snugly engage the concaved surfaces of the ring members, said rollers being of a width slightly less than the thickness of the said ring members whereby a greater bearing surface will be provided, thus preventing wear upon the ring members at any one particular point as would be the case with the original form of circular ball-bearings.

The bearing rollers 14 are maintained in spaced relation by a cage 16 in the form of a band, arranged between the ring members 10 and 11 and formed from a section of material of I beam configuration in cross section, to provide the cage with a web portion having formed therein spaced and transversely extending openings 17, in which are arranged the bearing rollers 14, with the transverse side walls of the openings 17 having formed integral therewith upstanding flanges 18, the ends of which are spaced from the end walls of the openings 17, said flanges being shaped to conform to the convexed bearing faces of the rollers 14 with which said flanges contact and prevent displacement of the rollers from within said openings.

The continuous flanges 19 of the cage 16 which are arranged at opposite ends of the web portion of the cage are each provided with alined notches forming upstanding ears 19' at the ends of the openings 17, for contact with the ends of the bearing rollers and coacting with the flanges 18 in preventing displacement of the bearing rollers from within the openings 17.

It will also be obvious that any angular movement of the shaft upon which the bearing is mounted will permit of the movement of one of the rings 10 or 11 relative to the other in opposite directions to an angle of approximately thirty degrees without interfering with the operation of the bearing for by reason of the concaved surfaces 13 of said rings and the convexed surfaces 15 of said rollers, the parts will at all times be held in operative position.

In the embodiment illustrated in Fig. 5 of the drawings, there is shown a slight modification in which the inner ring member 10' is provided with a beveled opening 12' whereby said member may be readily mounted upon a tapering shaft.

From the foregoing description taken in connection with the accompanying drawings, it will be seen that the invention contemplates providing a bearing which is exceedingly simple in construction thus reducing the cost of manufacture of the same to a minimum and which is durable and effective in carrying out the purpose for which it is designed.

What is claimed is:—

In a device of the class described, rings, a series of rollers interposed between said rings and having convexed bearing faces, a band interposed between said rings and having spaced openings therein receiving said rollers, arcuate flanges formed integral with the transverse side walls of said openings for contact with the bearing faces of said rollers, said flanges being of less length than said openings, and continuous flanges on the marginal edges of said band having spaced notches therein forming ears at the ends of said openings spaced from the ends of the arcuate flanges for contact with the ends of said rollers.

In testimony whereof I affix my signature in presence of two witnesses.

DAVID H. FRIEND.

Witnesses:
LAURENCE C. KEELER,
W. B. GILKEY.